C. W. ZIMMER.
BRAKE.
APPLICATION FILED MAY 18, 1915.
1,217,260.
Patented Feb. 27, 1917.
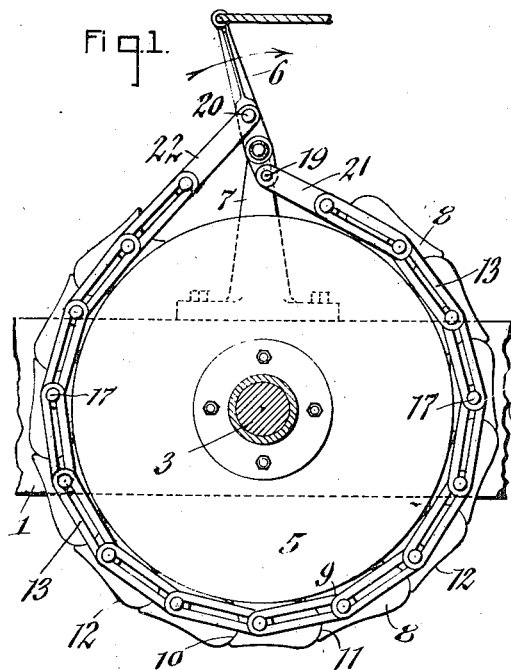
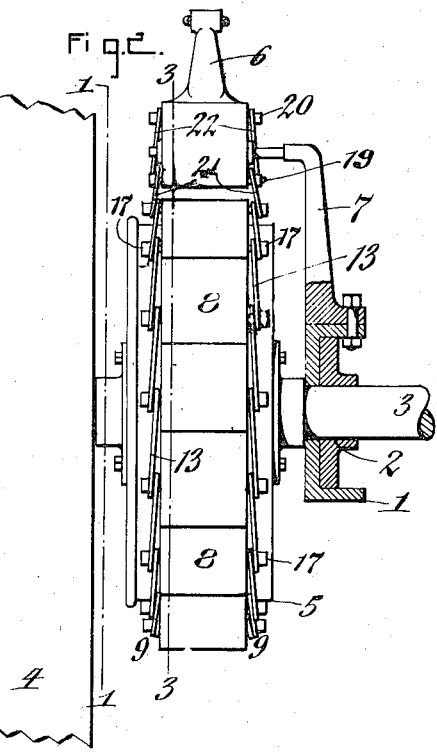
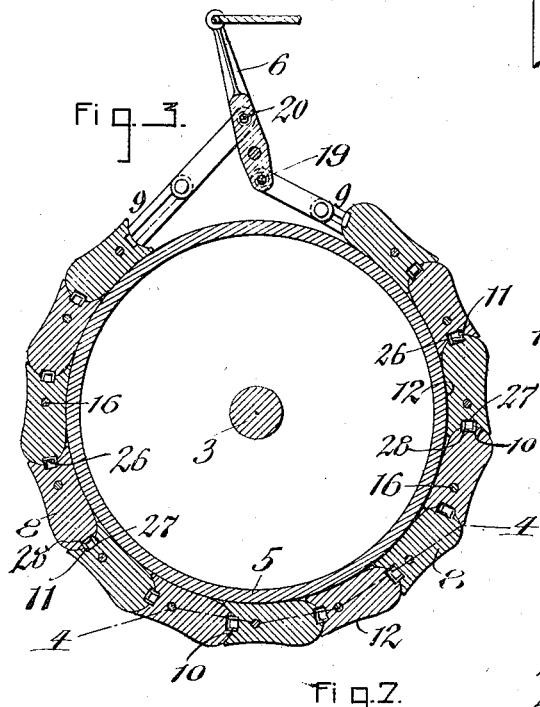
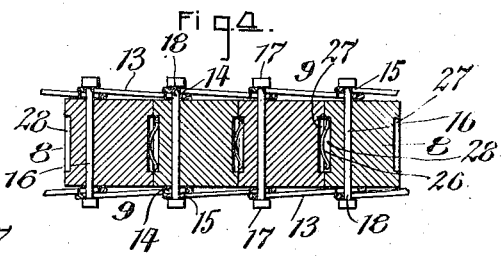
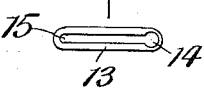
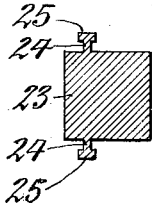
WITNESSES.
Julius J. Prible
W. Ray Taylor
INVENTOR
Conrad W. Zimmer
BY Geyer & Topp
ATTORNEYS

UNITED STATES PATENT OFFICE.

CONRAD W. ZIMMER, OF BUFFALO, NEW YORK.

BRAKE.

1,217,260. Specification of Letters Patent. Patented Feb. 27, 1917.

Application filed May 18, 1915. Serial No. 28,849.

*To all whom it may concern:*

Be it known that I, CONRAD W. ZIMMER, a citizen of the United States, residing at Buffalo, in the county of Erie and State of New York, have invented new and useful Improvements in Brakes, of which the following is a specification.

This invention relates to a brake which is more particularly designed for use in automobiles although the same may also be used elsewhere for the purpose of controlling the movement of a rotating part. In one form of brake heretofore in common use a brake band consisting of a flexible strip of sheet steel was placed around a drum and either engaged directly therewith or through the medium of a facing of fiber or similar material for the purpose of causing the same to grip the drum and prevent or retard its rotation. This form of brake is objectionable on account of the small amount of wear which is obtained from the sheet metal strip on the fiber facing and also on account of the slippage between the opposing members which renders the braking operation uncertain.

Furthermore, when such brake bands are worn out it usually necessitates renewing the entire band notwithstanding that some parts of the same may be little worn, thereby involving considerable expense when making such renewal.

It is the object of this invention to provide a brake of this type in which the band is made up of a plurality of shoes or sections which are arranged in an annular row around the drum and which are mounted upon a flexible operating member in such manner that the shoes or sections of the brake band can be reversed so that both sides of the same may be used successively until they are both worn out and therefore prolong the life of the brake band, and these shoes can also be detached from the operating member when worn out and replaced by new ones, thereby avoiding the necessity of renewing the entire brake band and effecting a corresponding saving in cost of maintenance. Furthermore, this form of brake band permits of constructing the brake shoes of cast iron which, upon engaging with the brake drum which is also usually of cast iron, permits of obtaining a much more powerful gripping action and increases the effectiveness and safety of the brake accordingly.

In the accompanying drawings: Figure 1 is a side elevation, partly in section of a brake embodying my invention, the section being taken in line 1—1, Fig. 2. Fig. 2 is an end elevation of my improved brake applied to the driving axle of an automobile and associated parts, the frame and adjacent parts of the running gear being shown in section. Fig. 3 is a vertical longitudinal section taken in line 3—3, Fig. 2. Fig. 4 is a fragmentary longitudinal section taken in line 4—4, Fig. 3. Fig. 5 is a side view of two adjacent links of an operating chain in their working position. Fig. 6 is a similar view of said links showing one of them in a reversed position for the purpose of illustrating the manner in which the links are coupled with each other. Fig. 7 is a side elevation of one of the links by itself. Fig. 8 is a sectional view of one of the brake shoes showing a modification of the means for pivotally securing the links of the operating chains thereto.

Similar characters of reference indicate corresponding parts throughout the several views.

Although my improved brake may be employed for various purposes it is shown in the drawings as applied to the driving axle of an automobile for controlling the rotation of the same. Those parts of the automobile which are shown in the drawings and which are adapted to receive the brake comprise a main frame 1 which is provided with a bearing 2 in which one end of the driving or rear axle 3 is journaled, said axle being provided at each of its ends outside of the frame with a driving wheel 4.

5 represents the brake drum of the brake mechanism which in this instance is secured to the axle between the frame and the driving wheel.

In its general organization my improvements comprise a flexible band or strap which surrounds the periphery of the brake drum and which is adapted to be either tightened upon the drum for retarding or stopping the rotation thereof or the same may be loosened to permit the free rotation of the brake drum together with the axle and the wheels associated therewith. This tightening and loosening of the brake band may be effected in any suitable manner, for instance as shown in the drawings, by means of a brake lever 6 pivoted on a bracket 7 which is mounted on the adjacent part of the main frame and connected on one side of its fulcrum with one end of the brake band and connected on the opposite side of its fulcrum with the other end of the brake band. By this means a forward movement of the brake lever in the direction of the arrow Fig. 1 causes the ends of the brake band to be moved toward each other and the band to be tightened upon the drum while upon turning the brake lever in the opposite direction the ends of the brake band will be separated and the grip of the band upon the brake drum loosened.

Considered as a whole the brake band comprises a plurality of brake shoes or sections 8 which are arranged in an annular row around the periphery of the drum, and two chains 9 which are arranged along opposite longitudinal edges of the row of shoes and pivotally connected with the same and also with the brake lever on opposite sides of the fulcrum thereof. The brake drum and the several brake shoes are both preferably constructed of cast iron so that a strong frictional engagement between these parts is obtained when tightening the shoes upon the drum, thereby effectively controlling the rotation of the drum. Each of the brake shoes is preferably provided at one of its transverse edges with a convex face 10 and at its opposite transverse edge with a concave face 11 and in the assembled position of the parts the concave face of one shoe engages with the concave face of an adjacent shoe so that together the several shoes form a practically continuous frictional bearing member which surrounds the greater part of the periphery of the brake drum. The brake band is capable of contracting and expanding relatively to the drum although each shoe, considered by itself, is rigid or inelastic. The operating chains are preferably connected with the several shoes centrally between the inner and outer sides thereof, so that when one side of the shoes is worn out the same may be reversed and the other side brought into engagement with the drum, thereby prolonging the life of the shoes and avoiding the necessity of frequent renewals of the same. In order to enable these shoes to obtain a firm and powerful hold on the drum the inner and outer sides of the same are preferably provided with concave bearing faces 12, 12, the curvature of which corresponds to that of the periphery of the drum thereby increasing the area of contact between the shoes and the drum accordingly and also increasing the efficiency of the brake. Although the chains or flexible members which connect opposite longitudinal edges of the brake shoes with the brake lever may be variously constructed, each of these chains preferably comprises a plurality of links 13 each of which is provided with a longitudinal slot, one end 14 of which is comparatively wide and the other end 15 thereof comparatively narrow, as shown in Fig. 7. The adjacent links of each of these chains overlap each other and are pivotally connected with one of the longitudinal edges of one of the shoes by means of a pintle projecting laterally from the respective longitudinal edge of the shoe. As shown in Figs. 3 and 4, the pintles on opposite sides of each shoe are formed upon a rod or pin 16 passing transversely through the respective shoe and provided at its opposite ends with enlarged heads 17 which are separated from the adjacent longitudinal edges of the shoe by intervening spaces so as to form necks 18 of smaller diameter than the heads 17 between the latter and the shoe. The necks of the pintle are of smaller diameter than the width of the narrow parts of the slots in the links but the heads of these pintles are of larger diameter than the narrow parts of these slots and of smaller diameter than the wide parts of the same. In the assembled position of the links of a chain the end of each link containing a narrow part of the slot therein and the end of an adjacent link having the wide part of a slot therein overlap each other, and each pintle passes with its neck through the narrow part of the slot of one of the overlapping links arranged next to the head of the pintle and through the wide part of the slot of the companion link which is arranged next to the respective brake shoe. By this means an articulate or pivotal connection is produced between the chains and the shoes which permits the latter to freely adapt themselves to the drum and also to be expanded and contracted as a whole for loosening or tightening the band without, however, permitting the shoes and the chains to become detached from one another. One pair of corresponding extremities of the chains are connected by means of a bolt 19 to the brake lever on one side of its fulcrum and the other corresponding extremities of the chains are connected by another bolt 20 to the brake lever on the opposite sides of its fulcrum, the endmost links 21, 22 of the two chains being preferably whole or unprovided with slots, as shown in Figs. 1 and 2. In assembling each chain with the shoes each link is first passed with the wide end of its slot over the head of one of the pintles until it is in line with the reduced neck thereof and then this link is moved lengthwise so that the reduced neck of the respective pintle engages with the narrow end of its slot and the wide part of the slot in the link is removed from the reduced neck of the last mentioned pintle. The wide part of the slot of another link is now passed over the head of the pintle of another shoe and caused to engage the outer side of the latter. In like manner another link is passed with the wide part of its slot over the enlarged head of the last mentioned pintle and is then moved lengthwise for engaging the narrow part of its slot at the opposite end thereof with the reduced neck of the respective pintle, whereby the last mentioned link will engage that end thereof containing the narrow part of the slot with the outer side of that end of the preceding link containing the wide part of its slot. This operation is continued in assembling each additional link and shoe so that when the several shoes and links of both chains have been thus assembled the same will be reliably interlocked and disengagement of one from the other is impossible after the end links 21, 22 are connected with the operating lever. The operation of disconnecting the links of the chains from the brake shoes is effected in a manner reverse from that just described.

In order to promptly release the brake shoes from the brake drum and hold them yieldingly clear of the drum when the brake is not in operation means are provided which tend to spread the shoes apart. The preferred means for this purpose comprise a plurality of bow springs 26 each of which is arranged in a pair of pockets 27, 28 formed in the opposing ends of two shoes and pressing against the bottoms of these pockets, as shown in Figs. 3 and 4.

Instead of making the pintles separate from the shoes, as shown in Figs. 3 and 4, these pintles may be formed integrally on opposite sides of each shoe, as shown in Fig. 8 in which the shoe is provided on its opposite longitudinal edges with integral pintles each of which comprises a reduced neck 24 projecting laterally from the shoe and provided at its outer end with an enlargement or head 25.

By this means of connecting the several shoes with each other the use of screws or nuts and bolts is avoided and the liability of the brake shoes becoming detached while in use is eliminated, thereby increasing the safety and reliability of the brake accordingly.

Furthermore, the ability to renew the shoes without discarding the chains permits of repairing the brake when the shoes are worn out without involving any unnecessary waste and expense and it also enables the operator to make such repairs in case of an emergency without being obliged to take his car to a garage or machine shop for this purpose.

I claim as my invention:

1. A brake comprising a drum, a plurality of shoes surrounding the drum, operating chains connected with opposite sides of the shoes, and springs interposed between the opposing ends of adjacent shoes and operating to yieldingly hold adjacent shoes apart from each other.

2. A brake comprising a drum, a plurality of shoes arranged in a row around said drum and provided on their opposing ends with pockets, springs arranged in said pockets and each bearing against the bottom of a pair of opposing pockets, and operating to yieldingly hold adjacent shoes apart from each other and operating chains connecting with opposite sides of said shoes.

3. A brake comprising a drum, a plurality of shoes arranged around the drum, and means for drawing the shoes against the periphery of the drum comprising two chains connected with opposite longitudinal edges of the shoes, each of said shoes having convex and concave faces at its opposite transverse ends, and engaging its transverse convex face with the transverse concave face of an adjacent shoe.

4. A brake comprising a drum, a plurality of shoes arranged around the drum, and means for drawing the shoes against the periphery of the drum comprising two chains connected with opposite longitudinal edges of the shoes and each of said shoes having its inner and outer sides provided with concave faces either of which may be engaged with the periphery of the drum.

5. A brake comprising a drum, a plurality of shoes arranged around the drum, and means for drawing the shoes against the periphery of the drum comprising two chains connected with opposite longitudinal edges of the shoes and each of said shoes having its inner and outer sides provided with concave faces either of which may be engaged with the periphery of the drum upon reversing the shoes on said chains.

6. A brake comprising a drum, a plurality of shoes arranged around the drum, and means for drawing the shoes against the periphery of the drum comprising two chains connected with opposite longitudinal edges of the shoes and each of said shoes having its inner and outer sides provided with concave faces either of which may be engaged with the periphery of the drum, each of said shoes having convex and concave faces at its opposite transverse ends, and engaging its transverse convex face with the transverse concave face of an adjacent shoe.

7. A brake comprising a drum, a plurality of shoes surrounding said drum, and means for tightening and loosening said shoes on said drum comprising two rows of chain links arranged along opposite longitudinal edges of the shoes, each link having a slot one end of which is narrow and the other wide and the adjacent links having their opposing ends overlapping each other, one of these coöperating ends containing the wide part of a slot and the other the narrow part of a slot, and pintles connecting the links with said shoes, each pintle projecting laterally from one longitudinal edge of one shoe and having a diameter smaller than the narrow part of said slots and a head at its outer end which is of larger diameter than the narrow part of said slots but of smaller diameter than the wide part of said slots, and the overlapping parts of each pair of adjacent links being arranged on the neck of one of said pins between the head thereof and the adjacent shoe, and that end of the respective link having the narrow part of a slot being arranged next to said head and that end of the companion link having the wide part of a slot being arranged next to the respective shoe.

Witness my hand this 10th day of May, 1915.

CONRAD W. ZIMMER.

Witnesses:
 THEO. L. POPP,
 ANNA HEIGIS.